Oct. 26, 1954    E. THOMSON    2,692,666
OVERLOAD RELEASE MECHANISM FOR CLUTCHES

Filed Sept. 14, 1949    3 Sheets-Sheet 1

INVENTOR:
Edward Thomson,
By Carr & Carr & Gravely,
HIS ATTORNEYS.

Oct. 26, 1954
E. THOMSON
2,692,666
OVERLOAD RELEASE MECHANISM FOR CLUTCHES
Filed Sept. 14, 1949
3 Sheets-Sheet 2
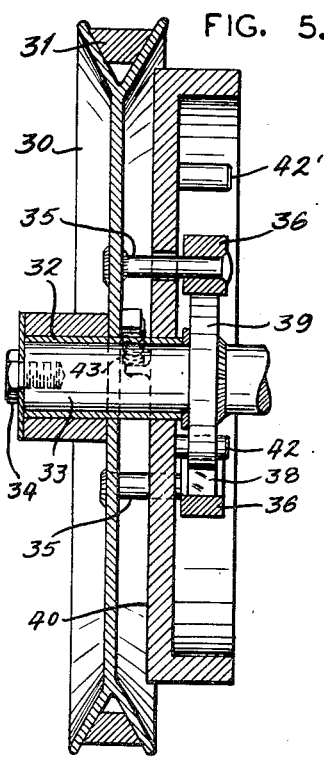
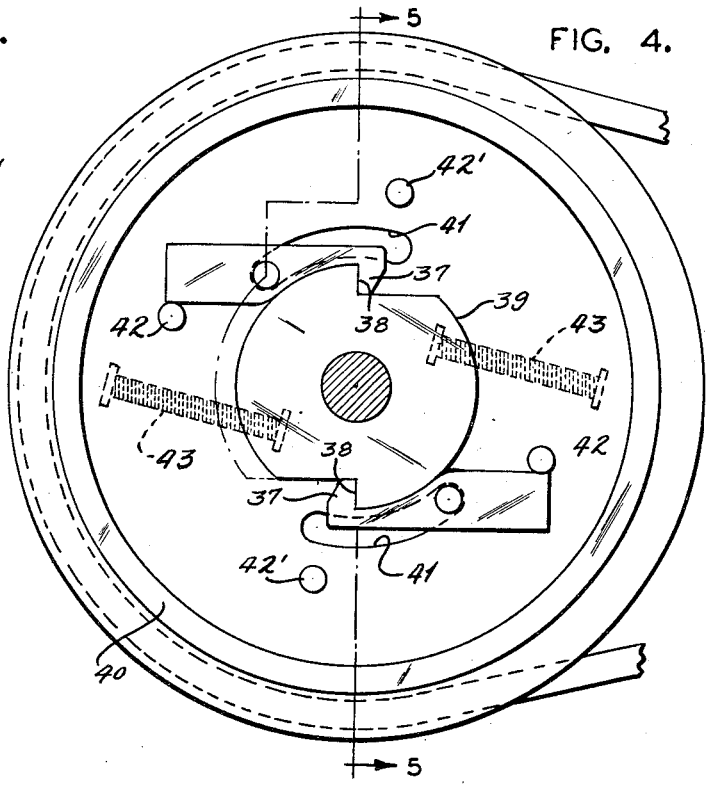
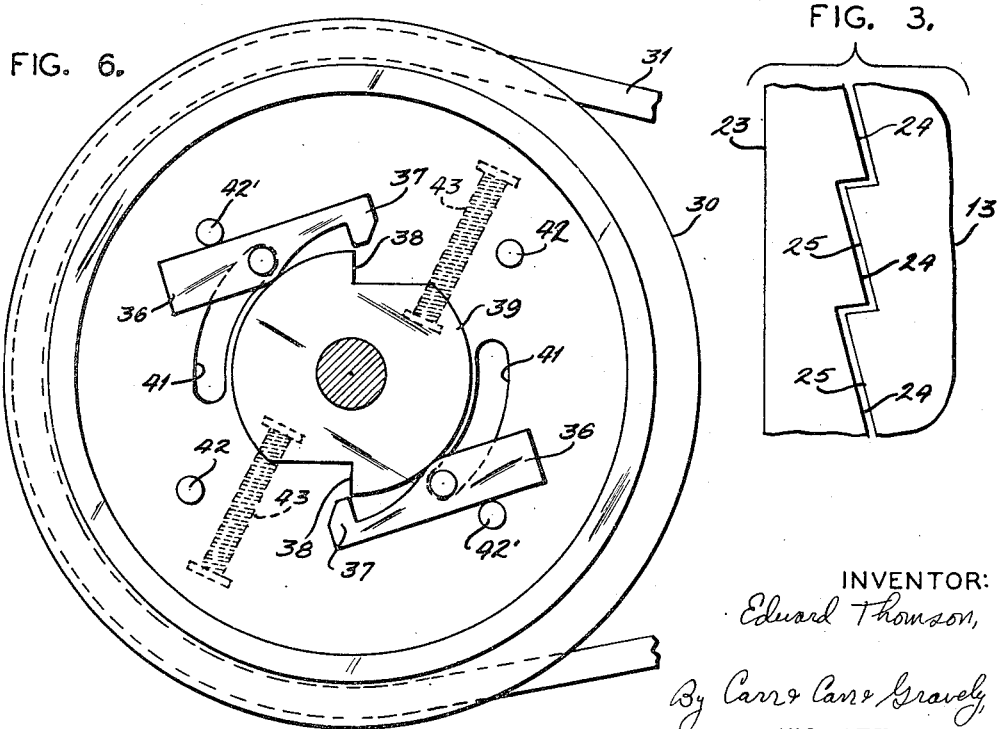
INVENTOR:
Edward Thomson,
By Carr & Carr & Gravely
HIS ATTORNEYS.

Oct. 26, 1954   E. THOMSON   2,692,666
OVERLOAD RELEASE MECHANISM FOR CLUTCHES
Filed Sept. 14, 1949   3 Sheets-Sheet 3
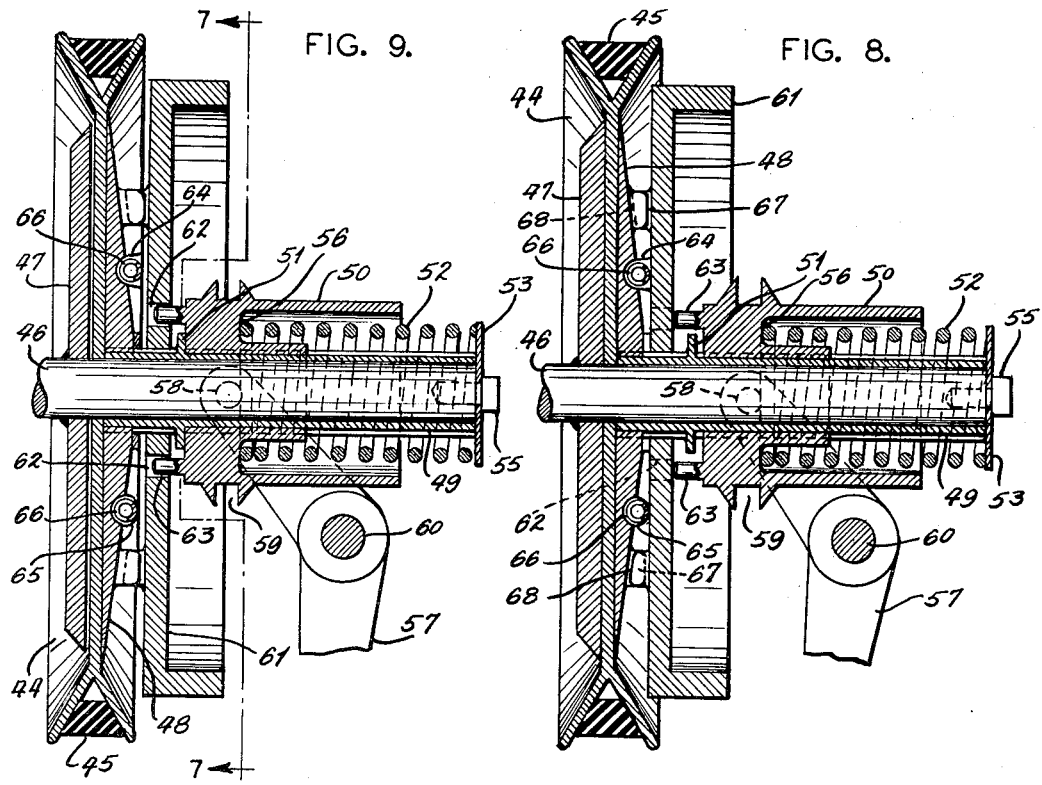
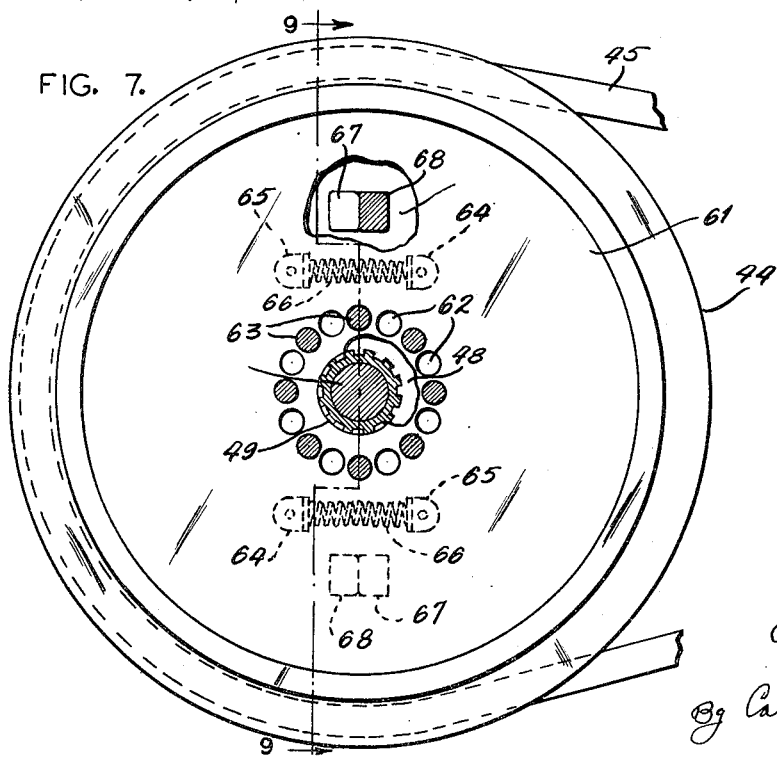
INVENTOR:
Edward Thomson,
By Carr, Carr & Gravely
HIS ATTORNEYS.

Patented Oct. 26, 1954

2,692,666

UNITED STATES PATENT OFFICE 2,692,666

OVERLOAD RELEASE MECHANISM FOR CLUTCHES

Edward Thomson, Ashley, Ill.

Application September 14, 1949, Serial No. 115,587

5 Claims. (Cl. 192—56)

This invention relates to clutches and is more particularly directed to clutches for machines subject to sudden or shock overloads and which contain mechanism for disengaging the clutch when that particular type of overload is encountered.

Prior to this invention, overload releases for clutches would permit the clutch to do a certain amount of slipping and allow continued operation of the prime mover and the machine operated thereby. There was no means provided for complete release of the clutch when sudden or shock overload was encountered. When this occurred the prime mover would stall, resulting in damage to the driven machine and possible damage to the prime mover. This invention provides mechanism for instantaneous release of the clutch when sudden or shock overloads are encountered, thereby preventing stalling of the prime mover and damage to the driven machine.

One of the objects of the invention is to provide release mechanism for a clutch that will disengage it after a sudden or shock overload is encountered.

Another object of the invention is to provide an overload release mechanism for disengaging the clutch upon encountering a sudden or shock overload and which will hold the clutch disengaged.

A further object of the invention is to provide a release mechanism for disengaging the clutch when sudden or shock overloads are encountered and which will enable the operator to disconnect the load from the prime mover and thereafter make whatever load adjustments are necessary for restoring normal operation of the prime mover and the machine driven thereby.

This invention consists in the provision of an inertia device for a clutch which, during normal operation thereof, will rotate therewith and, under normal overloads, will not disengage the clutch but will rotate relative to the clutch when it encounters sudden or shock overloads and will also operate the lever or linkage mechanism that disengages the clutch, thus avoiding stalling or choking of the prime mover.

In the drawings:

Fig. 3 is an enlarged detail view of a portion of the inertia mechanism,

Fig. 4 is an end view of a modified form of the invention,

Fig. 5 is a sectional view taken substantially along the line 5—5 of Fig. 4,

Fig. 6 is an end view thereof with the clutch disengaged,

Fig. 7 is an end view of a modified form of the clutch taken along the line 7—7 of Fig. 9, Fig. 8 is a vertical section of the clutch in engaged position; and Fig. 9 is a vertical section taken substantially along the line 9—9 of Fig. 7.

Figure 1:
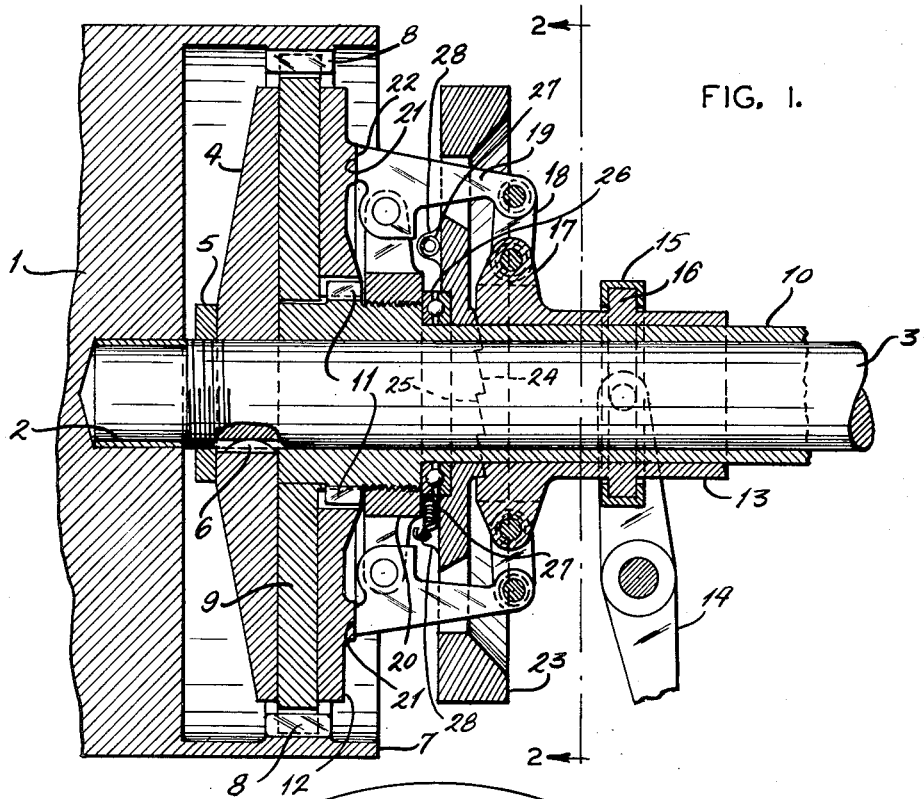
Fig. 1 is a vertical sectional view of a disc clutch embodying the invention.
Figure 2:
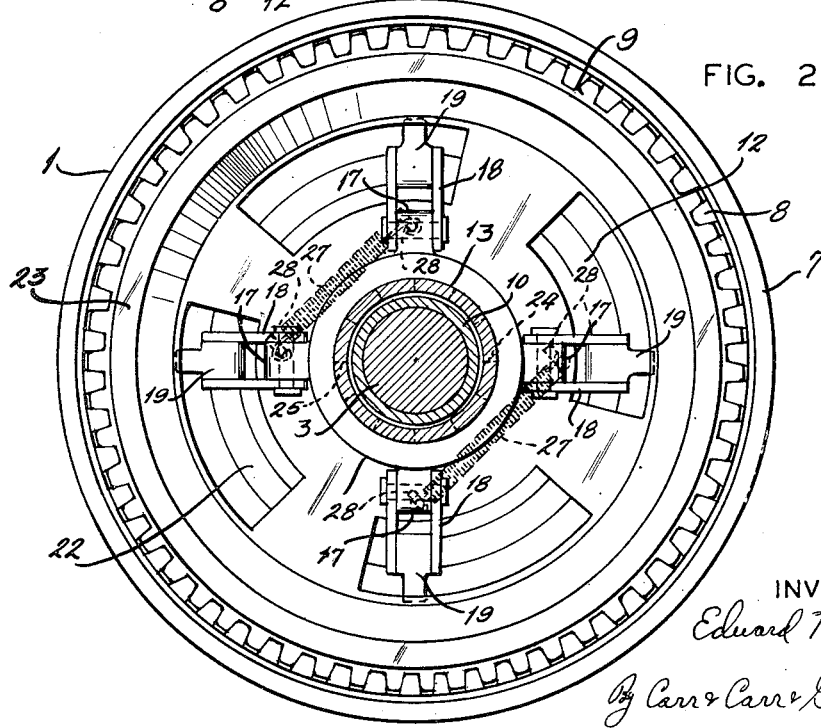
Fig. 2 is a sectional view taken along the line 2—2 of Fig. 1.

The invention is embodied in an over center clutch employed in certain types of farm tractors, in which the numeral 1 designates the engine flywheel suitably mounted on the crank shaft (not shown) of the tractor engine. The flywheel is provided with a pilot bearing 2 in which one end of the driven shaft 3 is rotatably supported. A fixed pressure plate 4 is secured to the driven shaft 3 at one end thereof and held in position thereon by means of a nut 5 and a key 6. The flywheel is provided with an axially extended rim 7, on the interior of which a plurality of splines 8 are formed. These splines engage the splined periphery of the driving clutch plate 9. The driving clutch plate is concentric with a sleeve 10 mounted on shaft 3 and holds the driving clutch plate in alignment with the splines 8 in the flywheel rim. The sleeve 10 is provided with splines 11 cooperating with a movable clutch pressure plate 12 having a bore therein whose periphery is splined for cooperating with splines 11. The pressure plate 12 is moved into engagement with the driving clutch plate 9 by means of a clutch operating sleeve 13 axially moved along the sleeve 10 by a pivoted manually operated lever 14, one end of which engages a slip collar 15 cooperating with a collar 16 on the sleeve 13. The sleeve 13 is provided with a plurality of outwardly projecting brackets 17 to each end of which toggle lever 18 is pivoted. The other end of the toggle lever 18 is pivoted to one end of a lever 19 pivoted to a ring 20 threaded on sleeve 10, suitable brackets being formed thereon in which levers 19 are pivoted. These levers are provided with abutments 21 which are engageable with the thrust receiving surface in the form of a ring 22 integral with the movable pressure plate 12. The pressure plate is brought into engagement with the driving clutch plate 9 by axially moving the clutch sleeve 13 along sleeve 10 so that the pivots for the toggle lever 18 on sleeve 13 will be positioned to the left of the pivots of the toggle lever 18 in levers 19.

The overload release mechanism for the clutch comprises an inertia disc 23 provided with an enlarged rim concentrically disposed about sleeves 10 and 13. The levers 19 extend through suitable arcuate apertures cut in disc 23 so that the disc can rotate relative to the sleeve 10. The disc 23 has a plurality of axially extended teeth 24 formed on its hub that cooperates with similarly shaped teeth 25 on the adjacent end of sleeve 13. A thrust bearing 26 is disposed between the inertia disc 23 and the enlarged portion of sleeve 10. A pair of springs 27 are connected between brackets 28 on the inertia disc 23 and pins provided in suitable projecting brackets on ring 20 so that relative reverse motion of the inertia disc will be possible for restoring it to its original position. The primary function of the springs 27 is to restore the parts to their original position after the sleeve 13 and its associated mechanism has been released.

The operation of this device is dependent upon the imposition of a shock load on the driven shaft 3 and provides for disengagement of the movable clutch pressure plate 12 from the driving plate 9 for the purpose of preventing the stalling or choking of the prime mover to which flywheel 1 is connected. Assuming that a sudden overload has been imposed on the shaft 3, the disc 23 will continue its rotation within the limits of the arcuate slots but relative to sleeve 10. When this action takes place, teeth 24 on the hub of disc 23 and the teeth on the end of sleeve 13 will cause this latter sleeve to move outwardly, thus placing the pivots in brackets 17 to the right of the pivots between toggle levers 18 and lever 19. This movement is sufficient for the purpose of disengaging the clutch and permitting the prime mover to continue its operation and enabling the tractor operator to remove the cause of the overload, thereby preventing damage to the prime mover or to the machine being driven thereby.

A modified form of the invention is illustrated in Figs. 4, 5 and 6 which comprises a driving pulley 30 having a belt 31 thereabout that receives power from a suitable prime mover (not shown). The pulley 30 is rotatably supported on a bearing sleeve 32 held on shaft 33 by a screw and washer combination 34. The pulley is provided with a pair of pins 35 on the outer ends of which levers 36 are pivotally supported. These levers are provided with hooks 37 engageable with ratchet teeth 38 on disc 39, constituting the driven member of the clutch in conjunction with shaft 33.

The overload release mechanism comprises an inertia disc 40 provided with an axially extended rim and mounted on sleeve 32 and having arcuate slots 41 therein through which pins 35 extend, thus permitting the inertia disc 40 to rotate relative to the pulley 30, the slots determining the extent of relative rotation. Levers 36 engage pins 42 when the clutch is engaged, as shown in Fig. 4; and pins 42' engage levers 36 when the clutch is disengaged, as shown in Fig. 6. Pins 42 hold the latches in engaged position and pins 42' limit the outward movement of the latches.

Compression springs 43 are disposed between suitable abutments on the inertia disc 40 and pulley 30. The springs 43 hold the clutch in engaged or disengaged position. After the inertia disc 40 has been rotated relative to the pulley 30, thereby placing springs 43 on opposite sides of the shaft 33 axis, it is necessary to manually reversely rotate the inertia disc for the purpose of reengaging the clutch. The springs 43 are disposed on opposite sides of shaft 33 and suitably secured thereto. When the pulley 30 and the inertia disc 40 rotate relative to each other, the springs are compressed a maximum amount when in substantial alignment with each other through the axis of shaft 33. During the relative motion, the springs pass through the radial alignment, also called over-center movement, they expand, and in so doing, assist in completing the relative motion and then hold the parts in such position until moved reversely. These springs act in the same manner as they do in prior art over-center clutches.

The pulley 30 is rotated in a counter-clockwise direction and when a sudden or shock overload is imposed on shaft 33, the inertia disc 40 will rotate relative to pulley 30 and sleeve 32. This action will cause the levers 36 on hooks 37 to be lifted outwardly by engaging pins 42', thus enabling them to clear the ratchet teeth 38 on disc 39, thereby permitting the pulley 30 and the inertia disc 40 to rotate relative to shaft 33 which action disconnects the power source from shaft 33, thereby preventing possible damage to the prime mover or to the machine driven thereby.

Another modified form of the invention is shown in Figs. 7 through 9 in which 44 is a pulley driven by a belt 45 connected to a suitable prime mover (not shown). The pulley 44 is rotatably mounted on a shaft 46 to which a fixed clutch pressure plate 47 is secured, as by welding or other suitable means, the disc being engageable with pulley 44. A movable clutch pressure plate 48 is disposed on the opposite side of pulley 44 and is splined to a sleeve 49 axially slidably mounted on shaft 46. The sleeve 49 has a clutch spool 50 slidably mounted thereon and engageable with a collar 51 integral with sleeve 49, the clutch spool 50 being splined to the sleeve 49. A spring 52 is disposed between the clutch and the spool 50. A disc 53 is clamped to shaft 46 by a screw 55. The spring 52 is disposed within the bore 56 cut in the clutch spool 50 and abuts the base of the bore and the disc 53. The spool 50 is moved axially of shaft 46 and sleeve 49 by means of a lever 57 provided with clutch spool pins 58 projecting into groove 59 in clutch spool 50. The movement of lever 57 about its pivot pin 60, in a clockwise direction, will move spool 50 on shaft 46 and sleeve 49 against the action of spring 52 for disengaging the pressure plates 47 and 48 from pulley 44. When the lever 57 is rotated about pin 60 the spool is moved away from the inertia disc 61. This relieves pressure between plate 48 and the pulley 44, thus permitting relative rotation therebetween. The spring 52 will reengage the clutch upon release of the lever 57.

The shock overload release mechanism comprises an inertia disc 61 provided with an axially extended rim and rotatably supported on sleeve 49. This disc is provided with a plurality of circularly arranged apertures 62 which are engageable by projecting pins 63 integral with the clutch spool 50. The number of pins 63 is preferably equal to the number of apertures 62. Suitably aligned abutments 64 and 65 are provided on the inertia disc 61 and movable pressure plate 48, respectively, springs 66 being disposed therebetween. A pair of lugs 67 and 68 are provided on the movable pressure plate 48 and the inertia disc 61, these lugs being normally held in abutting engagement with each other by the springs 66. The lugs limit relative rotation between the inertia disc and the clutch pressure plate 48 when the springs 66 restore them to their original positions. They rotate relative to each other by reason of the springs 66 after the pins have been withdrawn from apertures 62 by movement of the clutch spool 50 upon actuation of lever 57.

When the clutch is engaged, pins 63 bear against the disc on the surface thereof between apertures 62. The spring 52 then acts against the inertia disc 61 and movable pressure plate 48, thereby causing it to clamp pulley 44 between the pressure plates so that shaft 46 may be driven thereby.

Assuming that the prime mover has been subjected to a sudden overload, pulley 44 will have its motion arrested. The inertia disc 61 will continue to rotate and in so doing pins 63 will slip over the inertia disc until they are aligned with apertures 62. The spring 52 will cause the pins to enter apertures 62 and move the spool 50 until it engages collar 51, whereupon the pressure between plates 47, 48 and the pulley 44 will be relieved and disengage the clutch, as shown in Fig. 9, thus permitting the pulley to continue its rotation without stalling or choking the prime mover. When the pins 63 enter apertures 62, spring 52 will move the clutch spool into engagement with collar 51. The spring cannot now move the inertia disc 61 into engagement with the movable clutch plate, thereby preventing engagement of the clutch. The springs 66 will restore the clutch parts to their normal operative positions in which lugs 67 and 68 are in contact after release of the overload and upon manual disengagement of the clutch, lugs 67 and 68 then reengaging, as shown in Fig. 7, thus placing the clutch in condition for formal operation.

What I claim is:

1. A shock load responsive clutch comprising a driving member, a driven member, levered means freely pivotally mounted on one of said members for movement about a fixed axis into and out of a position effective for holding said members in engagement, an inertia device disposed about said driven member and capable of movement relative thereto, said inertia device having movement independent of but engaging said levered means to move the latter upon said relative movement for disengaging said driving and driven members when a shock load is encountered and spring means operably connected between said driving and driven members and adapted to retain said members disengaged following a shock load.

2. A shock load responsive clutch comprising a driving member and a driven member, levered means pivotally mounted on one of said members to be angularly movable between positions to control engagement and disengagement of said clutch members, an inertia device disposed adjacent said levered means, said inertia device being movable independently of said levered means for operating said levered means into clutch disengaged position when said clutch encounters a shock load and spring means operably connected between said driving and driven members and adapted to retain said members disengaged following a shock load.

3. A shock load responsive clutch comprising a driving member, a member connected to said driving member and adapted to pivot about an axis moving with said driving member, a driven member, a member fixed to said driven member to move therewith in fixed relation, said movable and fixed members being adapted to have engagement in the operative condition of the clutch with the driving member driving the driven member, and an inertia device operable normally with said members in the operative condition of the clutch and capable of movement relative thereto in response to shock load conditions, said inertia device being located adjacent said movable member and being adapted to pivot said movable member about its axis to effect disengagement of said fixed and movable members when a shock load is encountered.

4. A shock load responsive clutch comprising a driven member provided with a plate having teeth thereon, a driving member supported on said driven member, latches pivotally supported on said driving member normally in position to engage said plate teeth and engage said driving and driven members, an inertia disc concentric with said driving member and capable of rotation relative to said driving member, spaced elements fixed on said inertia disc for pivoting said latches from the teeth on said plate upon relative rotation of said inertia disc and driving member when said clutch is subjected to shock load to disengage said driving and driven members, and a pair of resilient elements engaged between said driving member and inertia disc on opposite sides of the clutch axis of rotation, said pair of elements exerting a force on said inertia disc to one side of its axis to hold said latches normally engaged with said plate teeth and upon relative rotation of said inertia disc and driving member to exert a force on said inertia disc to the opposite side of its axis to hold said latches in disengaged positions.

5. A shock load responsive clutch comprising a driven shaft, a plate provided with teeth and mounted on said shaft, a driving member supported on said shaft for rotation relative thereto, pins carried by said driving member in positions to be disposed on opposite sides of said driven member, a latch lever pivotally supported on each pin and engageable with one of the teeth on said plate, an inertia disc disposed about said shaft and having arcuate slots therein through which said pins extend, said inertia disc being capable of rotation relative to said shaft; means fixed on said disc in position engageable with said latch levers, when said inertia disc rotates relative to said shaft upon sudden stopping of rotation by reason of a sudden shock load, to pivot said latch levers in directions in which they are released from said teeth, thereby permitting said driving member to rotate relative to said driven member, and a pair of resilient elements engaged between said driving member and inertia disc on opposite sides of the clutch axis of rotation, said pair of elements exerting a force on said inertia disc to one side of its axis to hold said latches normally engaged with said plate teeth and upon relative rotation of said inertia disc and said shaft exerting a force on said inertia disc to the opposite side of its axis to hold said latches in disengaged positions.

References Cited in the file of this patent

UNITED STATES PATENTS

| Number | Name | Date |
|---|---|---|
| 336,588 | Rice | Feb. 23, 1886 |
| 1,125,646 | Campbell | Jan. 19, 1915 |
| 1,901,597 | Hauk | Mar. 14, 1933 |
| 2,445,590 | Stephenson | July 20, 1948 |
| 2,486,603 | King, Jr. | Nov. 1, 1949 |

FOREIGN PATENTS

| Number | Country | Date |
|---|---|---|
| 18,316 | Great Britain | 1914 |
| 903,072 | France | 1945 |